UNITED STATES PATENT OFFICE.

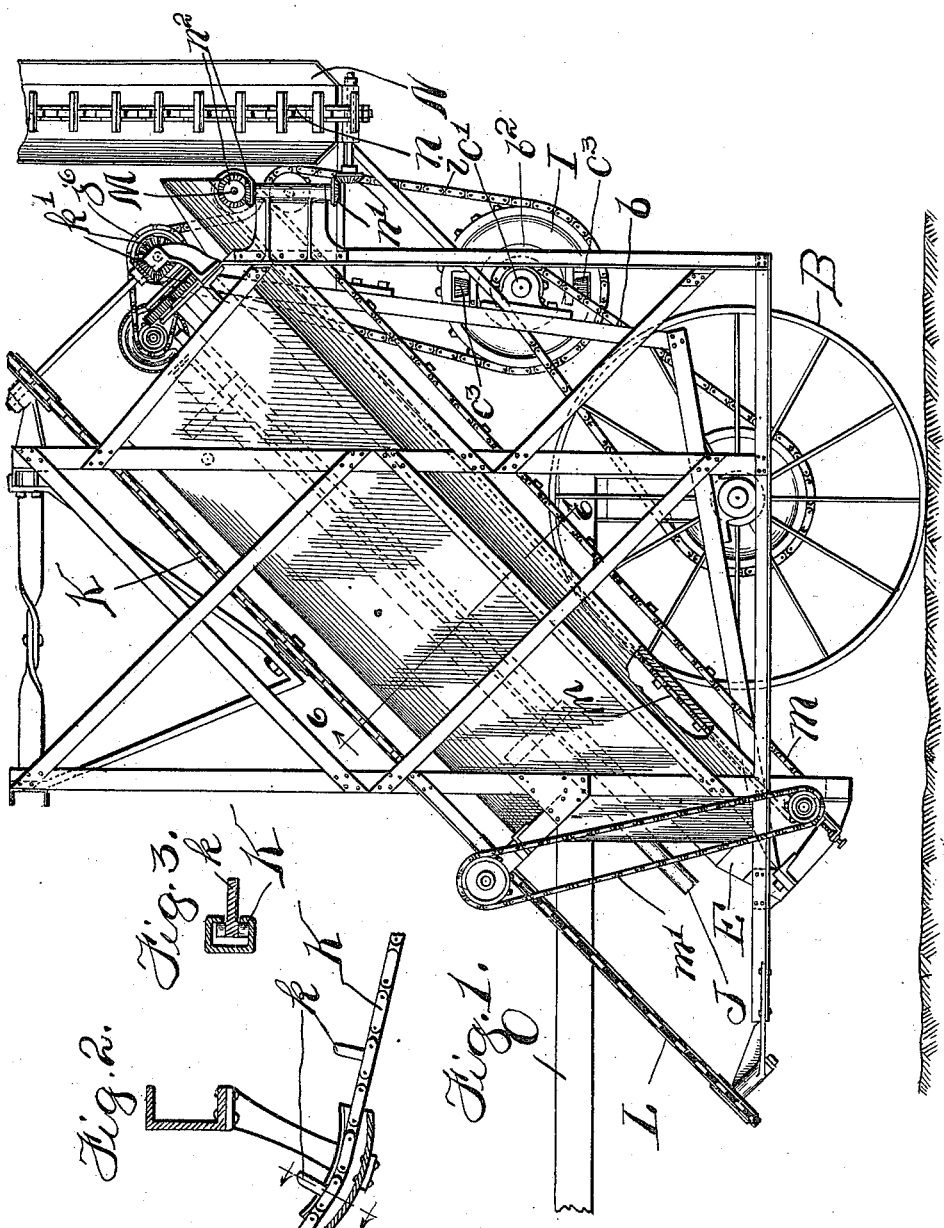

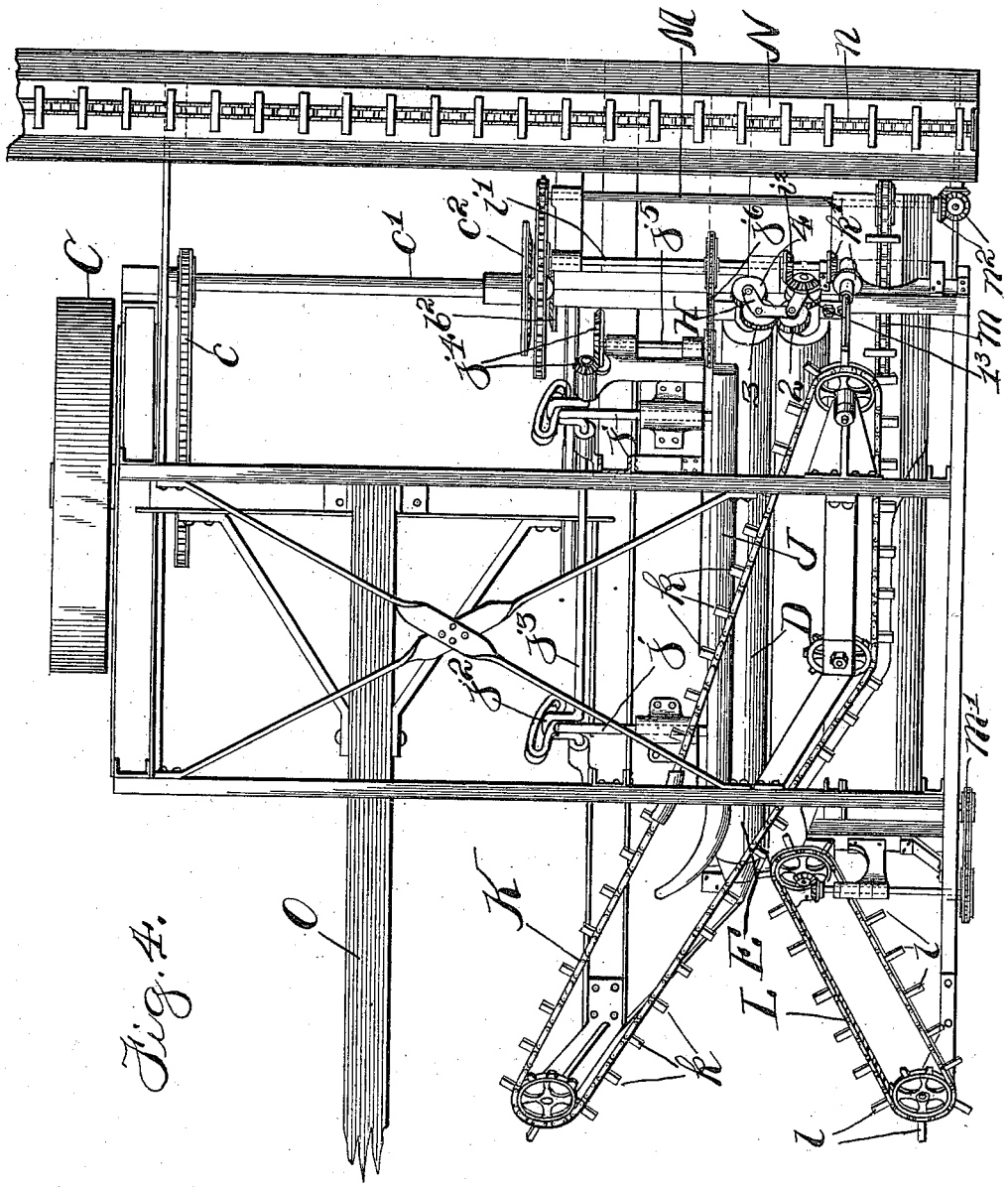

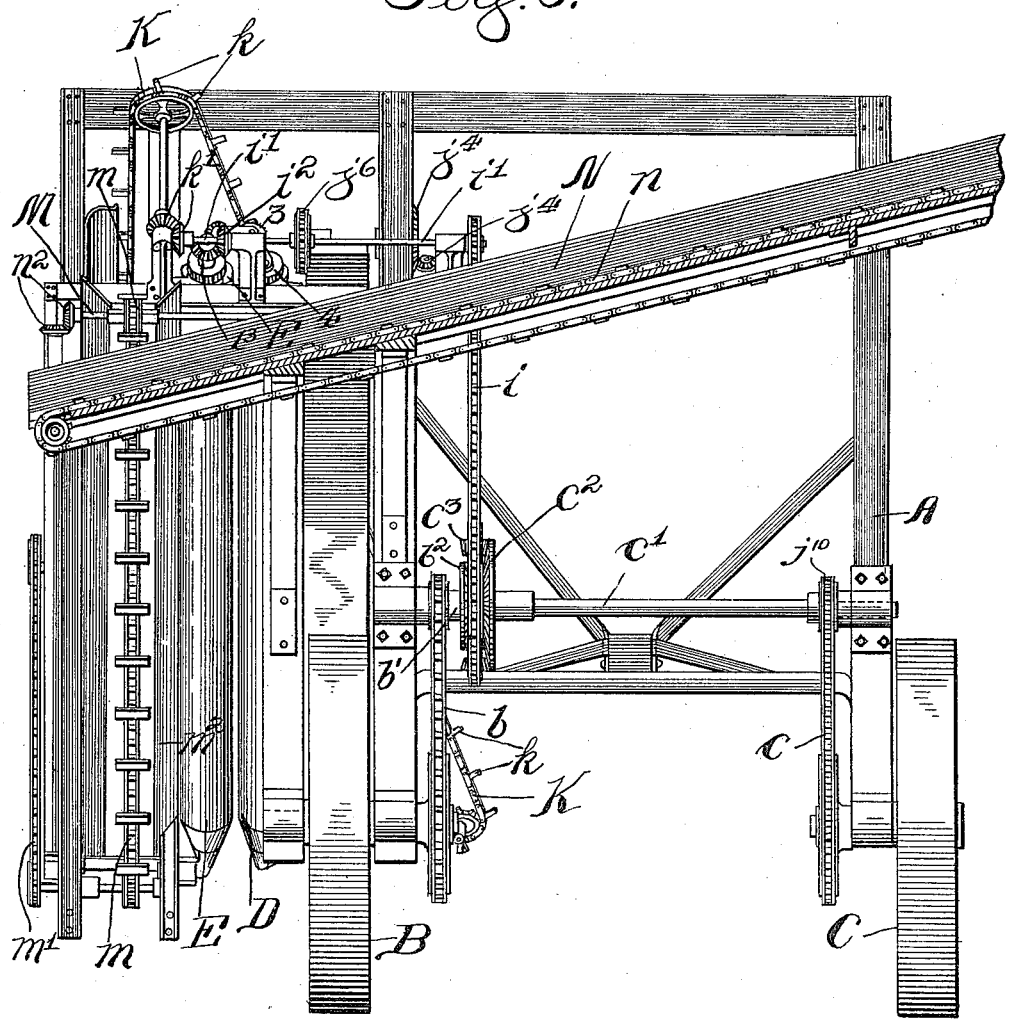

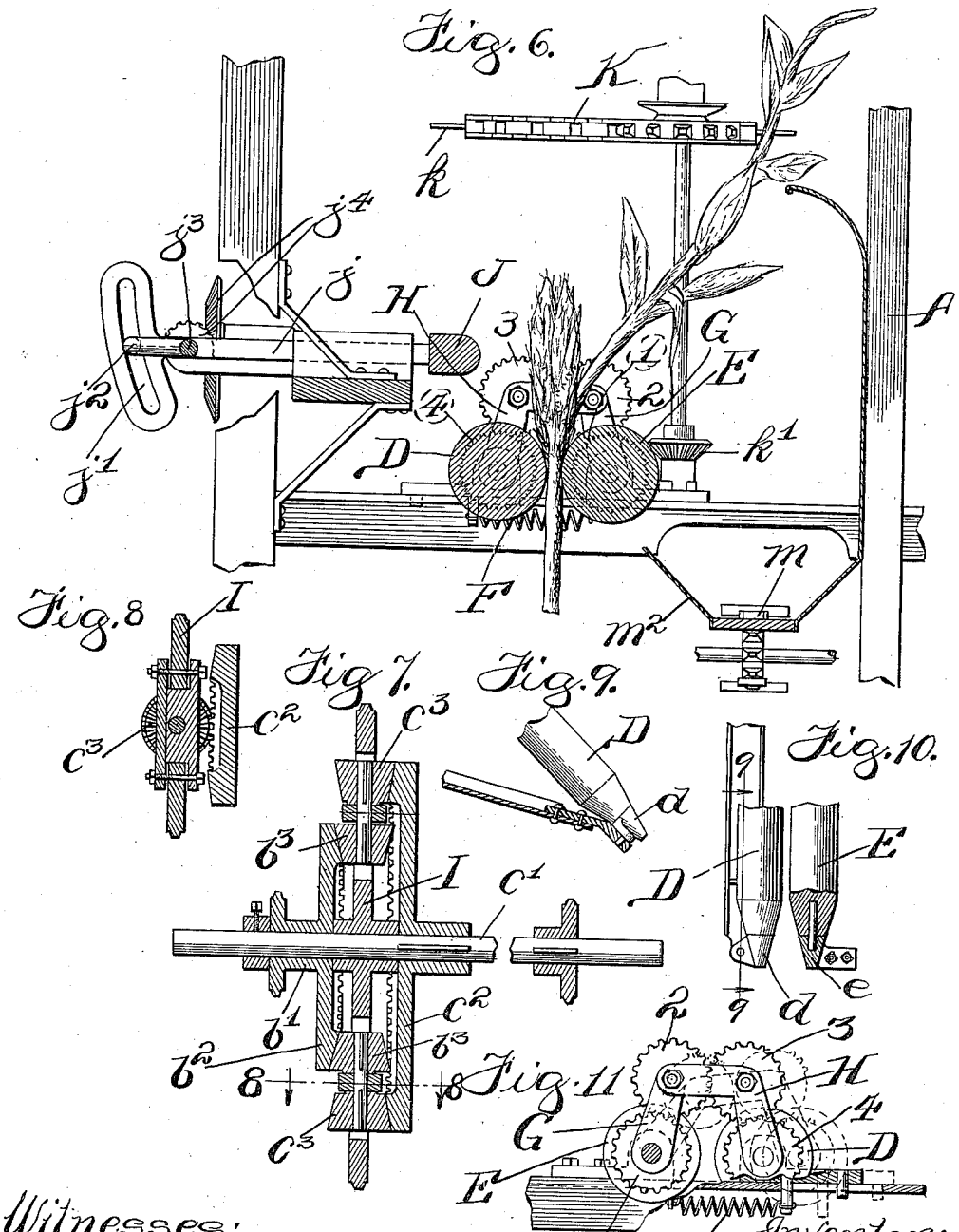

BYRON C. SMALL, OF MORRIS, ILLINOIS, ASSIGNOR TO THE B. C. SMALL MANUFACTURING COMPANY, OF COAL CITY, ILLINOIS, A CORPORATION OF ILLINOIS.

CORN-HUSKING MACHINERY.

976,223. Specification of Letters Patent. Patented Nov. 22, 1910.

Application filed August 6, 1904. Serial No. 219,711.

*To all whom it may concern:*

Be it known that I, BYRON C. SMALL, a citizen of the United States of America, and resident of Morris, Grundy county, Illinois, have invented a certain new and useful Improvement in Corn-Husking Machinery, of which the following is a specification.

My invention contemplates an improved and highly efficient machine of that type adapted to be drawn through a corn field and to strip the ears of corn from the stalks as it passes along, leaving the corn husks on the stalks.

Generally speaking, the object of my invention is the provision of an improved and highly efficient corn husking machine of the above general character; and a special object is the provision of an improved means for separating the ears of corn from the stalks and husks without materially injuring either the corn or the stalks and husks; and another object is to provide an arrangement whereby the tendency of the machine to deviate from a straight line of travel, due to the side draft or side resistance offered by the corn stalks to the overhanging husking means, will be counteracted by causing the two vehicle wheels by which the husking means is driven to work independently of each other—that is, imposing all or the greater part of the work upon the wheel at one side of the machine, should the resistance offered by the corn stalks at the other side of the machine tend to skew or swerve the machine around to one side; and still another object is to provide an improved arrangement of rolls adapted to draw the corn stalks between them, and to yieldingly spread apart as the stalks and husks pass between them; and a further object is to provide a machine adapted to reach out in advance of the rolls, and to collect and gather the corn stalks together, so as to insure their introduction in a proper manner between the lower and forward ends of the two rolls; and it is also an object, of course, to provide details and features of improvement tending to increase the general efficiency and serviceability of a corn husking machine of this particular character.

To the foregoing and other useful ends, my invention consists in matters hereinafter set forth and claimed.

In the accompanying drawings Figure 1 is a side elevation of a corn husking machine embodying the principles of my invention; Figs. 2 and 3 are details of one of the general devices for reaching out and drawing the corn stalks between the two rolls of the machine; Fig. 4 is a plan of the machine shown in Fig. 1; Fig. 5 is a rear elevation of the machine shown in Fig. 1; a conveyer for disposing of the husked ears of corn being shown in longitudinal section; Fig. 6 is an enlarged detail section on line 6—6 in Fig. 1; Fig. 7 is an enlarged sectional view of the differential gearing through which power is communicated independently by each vehicle wheel to the husking means and other operative parts; Fig. 8 is a detail section on line 8—8 in Fig. 7; Fig. 9 is a detail of the lower end of one of the rolls; Fig. 10 is a detail plan view of the lower portions of both rolls; Fig. 11 is a view of the gear-connections between the upper ends of the two rolls.

As thus illustrated, my invention comprises a suitable body-frame A, mounted on a pair of vehicle wheels B and C, and adapted to support the husking means and other operative parts in suitably elevated positions. The rotatable rolls D and E, which receive the corn stalks between them and grip and hold the butt-end of each unhusked ear of corn until the ear is knocked out of the husks, are preferably disposed at the left hand side of the body-frame and inclined rearwardly and upwardly. As shown in Fig. 10, the lower ends of said rolls are tapered more or less, and mounted in bearings *d* and *e*, which latter taper in continuation of the taper of the lower ends of the rolls. In this way, the lower ends of the rolls are tapered to provide a flaring space into which the corn stalks are first received. As will hereinafter more fully appear, the roll D is preferably adapted for swinging adjustment toward and away from the other roll, and to such end that the bearing *d* is pivoted to the body-frame. At their upper ends, the two rolls are yieldingly connected by a spring F, and also by the straight link G and the L-shaped link H. The four gears 1, 2, 3 and 4 serve as the power-transmitting connection between the two rolls, the roll E being driven from the vehicle wheels, and the power being then communicated through the said spur gears to the roll D. The gears 2 and 3 are idler gears, as they simply constitute a medium of connection between the two gears 1 and 4, the latter having axes coincident with the axes of the two rolls. With this arrangement, it is obvious that the two rolls can spread apart at their upper ends without in any way disarranging or destroying the efficiency of the power-transmitting connection between them. Preferably, inasmuch as the husking means is thus mounted to overhang the left hand side of the machine, power is communicated from the two vehicle wheels in the following manner: From the wheel B, through sprocket wheels and a sprocket chain $b$ to a sleeve $b^1$, and from the wheel C through similar sprockets and a chain $c$ to a shaft $c^1$. The bevel gears $b^2$ and $c^2$ are rigidly connected respectively with the said shaft and sleeve, the latter, however, being loose on the shaft. The intermediate member I is loose on the said shaft and carries the small bevel pinions $b^3$ and $c^3$, which latter are engaged respectively by the bevel gears $b^2$ and $c^2$. The periphery of the intermediate member I is provided with sprocket teeth adapting it to serve as a sprocket wheel. A sprocket chain $i$ connects the member I with a sprocket wheel on the shaft $i^1$, and from this shaft power is communicated through the bevels, $i^2$ and $i^3$, to the roll E. With this arrangement, it is obvious that the differential gearing is included in the power-transmitting connection between the ground or vehicle wheels and the husking means, whereby each wheel does its work independently of the other; and also whereby all or a greater part of the work of driving the husking means is imposed on the wheel C, should the resistance offered by the corn stalks as they enter between the two rolls tend to skew or swerve the machine around to one side. In other words, the said resistance or side draft brought about by causing the corn stalks to engage the machine at one side, is counteracted by causing the wheel C to drag or pull hard, so to speak, as soon as it attempts to run ahead of the other wheel.

As soon as a corn stalk is brought between the two rolls, as shown in Fig. 6, the unhusked ears of corn on the stalk are brought in turn to a position between the rolls, the rolls gripping and pinching the butt-end of each unhusked ear as soon as it arrives at the proper point: but before the entire ear can pass between the rolls, the ear of corn is broken off and knocked out of the husks, the husked ear being then dropped and disposed of in any suitable manner, while the corn husks remain on the stalk and pass through the rolls. Any suitable means can be employed for accomplishing this broadly novel feature of knocking the ears of corn out of the husks: as illustrated, the said means comprises a vibratory knocker-bar J, arranged parallel with the two rolls and in position to give the ears of corn a sharp blow as fast as they arrive at points where the butt-ends of the ears can be securely gripped and held momentarily between the two rolls. This bar is shown mounted on reciprocating rods $j$, the latter being carried in suitable bearings on the body-frame. As a simple and efficient arrangement for reciprocating these rods, each rod has its end-portion provided with an oblique and slightly curved slot $j^1$, and each slot is engaged by a crank $j^2$. These cranks are mounted on a shaft $j^3$, which is connected with the previously mentioned shaft $i^1$, through the medium of bevel gears $j^4$, a shaft $j^5$ and sprocket wheels and sprocket chain $j^6$. Thus, with this arrangement, both the rolls and the vibratory knocker-bar are driven from the ground wheels—that is to say, the vehicle wheels upon which the body-frame is mounted. It is evident that the arrangement of the slots $j^1$ is such that the knocker-bar makes a quicker stroke in one direction than in the other—preferably a quicker back stroke than a forward thrust.

It will be understood that the framework can be suitably constructed to support the rolls and knocker-bar, and that suitable inclosing means can be employed, if it is deemed necessary or advisable. As a further feature of improvement, a pair of obliquely arranged sprocket-chains K and L are provided and arranged in position to reach out ahead of the rolls, so as to collect and gather the corn stalks between the lower ends of the rolls. For this purpose, said chains can be provided with projections $k$ and $l$ adapted to engage the corn stalks as the machine travels along parallel with the rows of corn. The chain K is shown as being of greater length than the chain L, and as crossing the two rolls obliquely. In this way, the chain K will bend the corn stalks over to one side, as shown in Fig. 6, thus allowing the ears of corn to be brought into better position for engagement by the knocker-bar. The chain K is driven from the shaft $i^1$ through the medium of bevel gears $k^1$, while the chain L is driven from the shaft M through the medium of sprocket chains $m$ and $m^1$. The shaft M is driven from the shaft $i^1$ by providing the former shaft with a sprocket wheel adapted to engage the sprocket chain $i$, as shown more clearly in Fig. 1. Furthermore, the sprocket chain $m$ is arranged at the bottom of a trough or chute $m^2$ adapted to receive the ears of corn which are knocked out of the corn husks by the vibratory knocker-bar. Said chain $m$ is provided with cleats or buckets, adapting it to act as a conveyer chain for carrying the husked ears of corn upwardly to a point where they may be discharged into a second trough or chute N. This transversely and upwardly inclined trough or chute N is also provided with a conveyer belt or chain $n$, whereby the ears of corn thus husked and mechanically harvested from the standing corn stalks may be discharged at the other side of the machine. The chain or belt $n$ is driven from the shaft M through the medium of bevel gears $n^1$ and $n^2$, and a short vertical shaft. It is obvious, however, that the various power-transmitting connections can be varied or changed to suit the requirements—as may be thought desirable or necessary.

As the corn stalks enter between the lower ends of the rolls, and as the machine moves along, the entire length of each corn stalk is caused to pass between the two rolls, and the ears of corn are knocked out of the corn husks as fast as the ears are caught and held at their butt-ends between the two rolls. Should an ear or other enlargement on the corn stalk pass on and through the rolls, it is obvious that the latter will easily separate and thus prevent breakage. It will be understood, however, that the spring means for yieldingly holding the two rolls together is of sufficient strength or tension to cause the rolls to momentarily pinch or grip the end of each ear at the point where it is joined to the corn stalk, thus holding the same in position to be struck by the vibratory knocker-bar. The blow or impact given by this bar breaks the ear of corn off from the stalk and knocks it out of the husks, which latter remain attached to the stalk, and which then pass on between the rolls. The body-frame may be provided with a tongue O secured in a suitable manner to the body-frame and by which the machine is drawn across the corn field. In this way the corn is stripped from the corn stalks as the machine travels along a row of corn, the husks being left there on the corn stalks. In other words, with my improved machine, the corn is mechanically husked and harvested without injuring either the corn or the fodder, the latter being left standing in the field.

It is obvious that the various details of construction can be changed or varied without departing from the spirit of my invention, and for this reason I do not limit myself to the exact construction shown and described. I claim broadly the feature of momentarily gripping an unhusked ear of corn at its butt-end and then striking it a blow sufficient to knock the ear of corn out of the husks. The feature of counteracting the side draft or side pull occasioned by the engagement of the corn stalks with the husking means at one side of the machine, is also a feature which I claim broadly. These, with other features, as herein described and claimed, constitute my invention.

With further respect to the feature of driving the husking means from the traction or ground wheels, I find that, with the construction and arrangement of gearing shown, the wheel C does more work than the wheel B, not only when the machine tends to swerve or swing to one side, but also when the machine is running straight ahead. In this way, more work is imposed upon the wheel C, owing to the difference in size of the wheels $c^2$ and $b^2$ and the presence of the rotary bevel pinions between the said bevel gears $c^2$ and $b^2$, with the result that the tendency of the machine to swerve to one side, owing to the over-hanging character of the husking means, is effectively counteracted. With further respect to the husking means, it will be seen that a relatively quick back or return stroke on the part of the knocker-bar J enables the latter to move back quickly after breaking off an ear of corn, and thus shift quickly out of the way of the next or succeeding ear of corn.

What I claim as my invention is:

1. A corn husking machine comprising means for gripping and holding the corn stalks, a vibratory knocker-bar arranged in position to knock the ears of corn out of the husks, together with means for vibrating said bar and for giving the same a quicker back stroke than forward stroke.

2. A corn husking machine comprising a pair of rotatable rolls between which the corn stalks are drawn, a sprocket chain having projections adapted to engage the corn stalks, said chain extending obliquely across the rolls, so as to bend the corn stalks to one side, and a knocker-device for knocking the ears of corn out of the husks just before the latter pass between the rolls.

3. A corn-husking machine comprising a pair of rotatable rolls between which the corn stalks are drawn, said rolls terminating at their ends in frusto-conical portions, a sprocket chain having projections adapted to engage the corn stalks, said chain extending obliquely across the rolls, so as to bend the corn stalks to one side, and a knocker-device for knocking the ears of corn out of the husks just before the latter pass between the rolls.

4. A corn-husking machine comprising a pair of rotatable rolls arranged parallel, means for reaching out in advance of the rolls and collecting and drawing the corn-stalks together between the forward ends of the latter, a sprocket chain having projections adapted to engage the corn stalks, said chain extending obliquely across the rolls so as to bend the stalks to one side, and a continuously acting knocker bar arranged in position to knock the ears of corn out of the husks just before the latter pass into the rolls.

5. A corn-husking machine comprising a pair of rotatable rolls between which the corn stalks are drawn, a sprocket chain having projections to engage the corn stalks, said chain extending obliquely across the rolls, so as to bend the corn stalks to one side, and means for removing the ears of corn out of the husks just before the latter pass between the rolls.

6. A corn husking machine comprising a pair of smooth rolls adapted to receive a corn stalk between them, a sprocket chain having projections adapted to engage the corn stalks, said chain extending obliquely across the rolls so as to bend the stalks to one side, and a vibratory knocker bar adapted to knock an ear of corn out of the husks while the latter are held between the said rolls, said rolls and knocker bar being arranged parallel with their upper ends farther to the rear than their lower ends.

7. In a corn harvesting and husking machine, ear snapping rolls, means operating upon the tops of stalks passing between the rolls to bend said stalks over one of the rolls, and ear detaching means coöperating with said bending means and snapping rolls.

8. In a corn harvesting and husking machine, rearwardly and upwardly inclined ear snapping rolls, laterally operating stalk bending means and transversely operating ear detaching means coöperating with the rolls for detaching the ears from the stalks.

Signed by me at South Wilmington, Illinois this 29th day of July 1904.

BYRON C. SMALL.

Witnesses:
　HENRY S. BARELLA,
　THOMAS OVERTON.